(12) United States Patent
Park et al.

(10) Patent No.: US 12,296,369 B2
(45) Date of Patent: May 13, 2025

(54) ALUMINUM PLATE COILING DEVICE

(71) Applicant: ALUTEC CO., LTD, Nonsan-si (KR)

(72) Inventors: Do Bong Park, Seoul (KR); Jin Woo Park, Daejeon (KR); Seong Heon Kim, Daejeon (KR)

(73) Assignee: ALUTEC CO., LTD, Nonsan-si (KR)

( * ) Notice: Subject to any disclaimer, the term of this patent is extended or adjusted under 35 U.S.C. 154(b) by 255 days.

(21) Appl. No.: 17/968,904

(22) Filed: Oct. 19, 2022

(65) Prior Publication Data
US 2024/0066578 A1 Feb. 29, 2024

(30) Foreign Application Priority Data
Aug. 25, 2022 (KR) .................. 10-2022-0106682

(51) Int. Cl.
*B21C 47/00* (2006.01)
*B21C 47/04* (2006.01)
*B65H 18/14* (2006.01)

(52) U.S. Cl.
CPC ............. *B21C 47/04* (2013.01); *B65H 18/14* (2013.01)

(58) Field of Classification Search
CPC ......... B21C 47/04; B21C 47/24; B21C 47/28; B21C 47/323; B21C 47/3416; B21C 47/063; B21C 47/3433; B65H 18/14
See application file for complete search history.

(56) References Cited

FOREIGN PATENT DOCUMENTS

| CN | 110935746 A | * | 3/2020 | ............. B21C 47/26 |
|---|---|---|---|---|
| CN | 211613946 U | * | 10/2020 | ............. B21D 11/06 |
| KR | 20040024273 A | * | 3/2004 | ............. B21C 47/24 |
| KR | 10-2010-0104731 A | | 9/2010 | |
| KR | 10-2011-0114101 A | | 10/2011 | |
| KR | 10-1482466 B1 | | 1/2015 | |
| KR | 10-2015-0094983 A | | 8/2015 | |
| KR | 10-2046961 B1 | | 11/2019 | |

* cited by examiner

*Primary Examiner* — Emmanuel M Marcelo
(74) *Attorney, Agent, or Firm* — NKL LAW; Jae Youn Kim

(57) ABSTRACT

An aluminum plate coiling device capable of coiling an extruded and rolled aluminum plate without generating distortion or deformation of the aluminum plate is disclosed. The aluminum plate coiling device has a simple structure, thereby being capable of achieving a reduction in installation space and a reduction in installation cost.

1 Claim, 4 Drawing Sheets

ALUMINUM PLATE COILING DEVICE

BACKGROUND OF THE INVENTION

Field of the Invention

The present invention relates in general to an aluminum plate coiling device, and more particularly to an aluminum plate coiling device capable of coiling an aluminum plate simultaneously with extrusion of the aluminum plate, without generating distortion or deformation of the aluminum plate.

In particular, the present invention relates to an aluminum plate coiling device having a simple structure, thereby being capable of achieving a reduction in installation space and a reduction in installation cost.

Description of the Related Art

Aluminum is not only light, easily castable, well alloyable with other metals, and easily machinable at room temperature and high temperature, but also exhibits electrical and thermal conductivity. In this regard, aluminum is widely used in industry as a whole.

Meanwhile, in order to eliminate various problems including environmental pollution caused by excessive consumption of fossil fuels in association with vehicles, not only is development of an electric vehicle (EV) and a fuel cell electric vehicle (FCEV) being conducted, but also development of a hybrid electric vehicle (HEV) having hybrid characteristics of an internal combustion engine and an electric vehicle is being conducted. These vehicles essentially use a battery.

As such a battery, a nickel battery, a lithium battery, or the like is mainly used. Such a battery has a structure configured to convert electrical energy into chemical energy, to store the chemical energy, and to convert the stored chemical energy into electrical energy in order to use the electrical energy, using a positive electrode material, a negative electrode material, an electrolyte, a separation membrane, etc.

Aluminum is used in various fields including a battery case, a battery pack housing, various frames, etc. of the above-described vehicle. Such aluminum is coiled in the form of a coil after being formed into a plate having a certain thickness, and is then supplied to a production line on which various elements will be manufactured.

Various methods of manufacturing an aluminum plate as mentioned above have been developed, and examples thereof are disclosed in Patent Documents 1 to 3.

Meanwhile, an aluminum plate manufactured through various technologies as disclosed in Patent Documents 1 to 3 is stored and transported in a state of being coiled in the form of a coil. Technologies for coiling an aluminum plate in the form of a coil are disclosed in Patent Documents 4 and 5.

Patent Document 4 discloses a strip coiling device of a hot rolling line including a bending roll configured to form a predetermined bending curvature at a strip on the hot rolling line, a trace information provider disposed rearwards of the bending roll and configured to sense information as to a bending curvature of the strip drawn from the bending roll and to provide the sensed information, a controller connected to the trace information provider and the bending roll and configured to control a gap of the bending roll, for control of the bending curvature of the strip according to the information provided from the trace information provider, and a coil box disposed rearwards of the bending roll and configured to coil the strip formed with a predetermined bending curvature through the bending roll.

Patent Document 5 discloses rolled product coiling equipment including a coiler configured to coil a rolled product and to discharge the coiled product, a path changer configured to change a path such that a defective one of products discharged from a rolling device is guided to a defective product discharge path, and a normal one of the products is guided to a coiling part of the coiler, an introduction guide device configured to guide the products discharged from the rolling device to an inlet of the path changer, and a feeding conveyor configured to feed the product discharged from the coiler in a coiled state. The coiler includes a fork type winding reel having a cylindrical outer surface, the coiling reel including a slit portion slit in a longitudinal direction, for introduction of an end of a rolled product therein, and opened at one end thereof, a driver configured to rotate the winding reel, an outer discharging unit disposed outwards of the winding reel and configured to push a side surface of a coiled product, thereby discharging the coiled product to the feeding conveyor, an outer reciprocator configured to reciprocate the outer discharge unit in a longitudinal direction of the winding reel, an inner discharge unit disposed within the slit portion of the winding reel and configured to push a central portion of the rolled product toward the feeding conveyor, thereby discharging the rolled product, an inner reciprocator configured to reciprocate the inner discharge unit in the longitudinal direction of the winding reel, a support configured to support the driver, a sliding rail configured to slidably support the support such that the support is movable in the longitudinal direction of the winding reel, and a sliding driver configured to reciprocate the support in the longitudinal direction of the winding reel.

Although technologies for coiling a rolled plate including an aluminum plate have been developed, as mentioned above, devices disclosed therein have complex structures and, as such, have difficulty in installation and occupy a large space. For this reason, there is a problem in that installation space is limited.

RELATED ART LITERATURE

Patent Documents

Patent Document 1: Korean Unexamined Patent Publication No. 10-2010-0104731

Patent Document 2: Korean Unexamined Patent Publication No. 10-2011-0114101

Patent Document 3: Korean Unexamined Patent Publication No. 10-2015-0094983

Patent Document 4: Korean Registered Patent No. 10-1482466

Patent Document 5: Korean Registered Patent No. 10-2046961

SUMMARY OF THE INVENTION

Therefore, the present invention has been made in view of the above problems, and it is an object of the present invention to provide an aluminum plate coiling device capable of coiling an extruded aluminum plate without generating distortion or deformation of the aluminum plate.

In particular, it is an object of the present invention to provide an aluminum plate coiling device having a simple structure, thereby being capable of achieving a reduction in installation space and a reduction in installation cost.

In accordance with the present invention, the above and other objects can be accomplished by the provision of a coiling device for coiling an aluminum alloy plate to be used as a material of a can or a case for a battery, the coiling device including a plurality of feeding rollers configured to feed an aluminum alloy plate output after being rolled, a pinch roller configured to press the plate fed by the feeding rollers toward a coiler, the coiler including a winding drum configured to rotate in accordance with driving of a driver, thereby winding the plate on the winding drum, and a guide configured to guide the plate such that the plate is uniformly wound without escaping from an end of the winding drum.

The guide may include a pushing roller installed at one end of a pivoting rod pivotally mounted to the coiler at another end thereof, and configured to press, toward the winding drum, the plate fed to a position over the winding drum, guide plates respectively installed at opposite ends of the pushing roller and configured to guide the plate to be wound on the winding drum while preventing opposite edges of the plate from escaping from the winding drum, and a pivoting device configured to pivot the pivoting rod, thereby causing the pushing roller to always be urged against the winding drum.

The winding drum may be formed with at least one slit extending in a width direction of the plate.

The coiling device may further include a coil discharging device installed under the winding drum. The coil discharging device may include a coil bogie configured to support a plate coil separated from the winding drum, a guide rail configured to guide movement of the coil bogie, and a driver configured to move the coil bogie along the guide rail.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
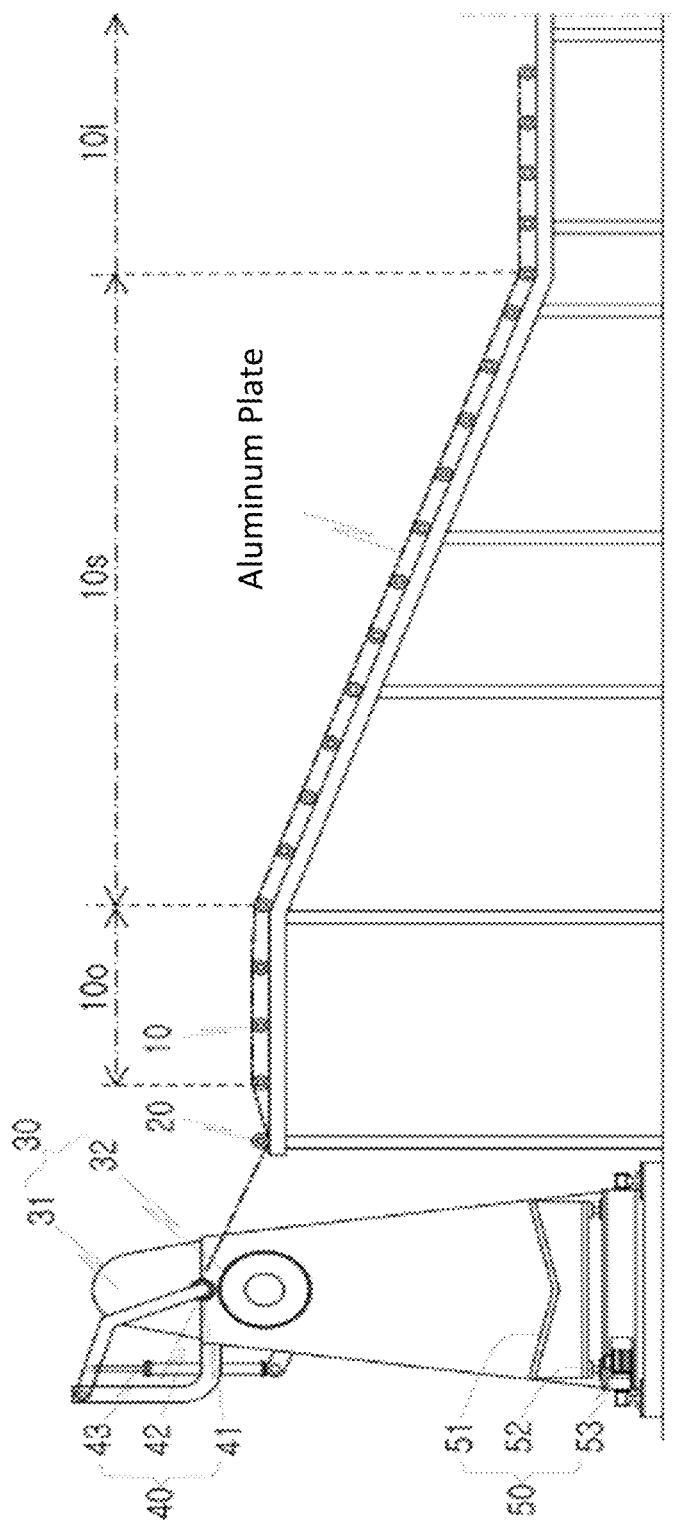
FIG. 1 is a front view of an example of an aluminum plate coiling device according to an exemplary embodiment of the present invention.

The present invention may be implemented through various alterations. Accordingly, the present invention will be described through specific embodiments illustrated in the accompanying drawings and detailed descriptions. However, the present invention should not be limited by the specific embodiments, and it is to be appreciated that all changes, equivalents, and substitutes that do not depart from the spirit and technical scope of the present invention are encompassed in the present invention.

The same or similar elements are designated by the same reference numerals. In the following description of the embodiments of the present invention, a detailed description of known functions and configurations incorporated herein will be omitted when it may obscure the subject matter of the embodiments of the present invention.

In the case of an aluminum plate coiling device according to the present invention, the entire configuration thereof is simple and, as such, a limitation in installation space is reduced, and the amount of materials used for manufacture of the device is reduced. Thus, a reduction in manufacturing cost may be achieved.

In particular, in conventional cases, when coiling of an extruded aluminum plate is performed, there may be a speed difference between a speed at an extrusion outlet and a coiling speed. In order to solve such a problem, a method, in which a pit having a depth of about 7 to 8 m and a length of about 3 to 5 m is formed in front of a coiling device so that an extruded plate is loosened in the pit, in order to prevent occurrence of a problem caused by a speed difference, is used. In accordance with the present invention, however, an encoder is installed to control the speed at the extrusion outlet and the coiling speed to be equal. Accordingly, loosening of the extruded plate in the pit is unnecessary and, as such, requirement of a pit is eliminated.

In addition, in the case of conventional extruded product coiling devices, installation of a hot rolling device and a tensioner for applying tension is often implemented. These devices function to press an extruded plate while applying tension to the extruded plate, thereby preventing opposite ends of the plate from escaping from opposite ends of a coil. In accordance with the present invention, however, an extruded plate does not pass through a position over a roller, but passes through a position under the roller and, as such, tension is naturally applied to the extruded plate. Accordingly, the plate may be maintained in a state of closely contacting an already coiled plate during coiling thereof. In addition, guide plates are installed at opposite ends of a pushing roller in order to enable the plate to be coiled without causing opposite ends thereof to escape from opposite ends of the already coiled plate. Thus, the coiling device may be simplified.

A pinch roller, which is configured to apply tension and disposed at a final one of feeding rollers, may be installed to face an upper surface of a feed table or to face a lower surface of the feeding table.

Referring to FIG. 1, a coiling device according to an exemplary embodiment of the present invention is shown. As shown in FIG. 1, the coiling device includes a plurality of feeding rollers 10 configured to feed an aluminum alloy plate output after being rolled, a pinch roller 20 configured to press the plate fed by the feeding rollers 10 toward a coiler 30, the coiler 30 including a winding drum 32 configured to rotate in accordance with driving of a driver 31, thereby winding the plate on the winding drum 32, and a guide 40 configured to guide the plate such that the plate is uniformly wound without escaping from an end of the winding drum 32.

As shown in FIG. 1, the feeding rollers 10 are installed to be spaced apart from one another by a uniform distance. Accordingly, the feeding rollers 10 support a rolled or extruded aluminum plate such that the plate moves smoothly without resistance.

A part of the feeding rollers 10 is installed such that neighboring ones thereof are disposed at the same level. However, a part of the feeding rollers 10 installed adjacent to the coiler 30 is installed along an inclined surface such that the feeding rollers 10 thereof are disposed at higher levels while being nearer to the coiler 30, respectively. Accordingly, the plate fed to the coiler 30 receives force in a direction opposite to the coiler 30 and, as such, maintains tension when being coiled by the coiler 30. Thus, uniform coiling may be achieved.

In other words, the feeding rollers 10, as shown in FIG. 1, the feeding rollers comprise a plurality of horizontal input sections 10i installed to be spaced apart from one another in a uniform distance, while being in parallel to neighboring ones of the plurality of the horizontal input sections, and installed horizontally at an end to which the aluminum alloy plate is fed and conveyed toward the winding drum, a plurality of horizontal output sections 10o installed horizontally relatively higher than the horizontal input section and a portion adjacent to the pinch roller 20, and a plurality of inclined conveying sections 10s installed to be inclined and disposed between the horizontal input section and the horizontal output section.

Of course, some feeding rollers 10 disposed adjacent to the coiler 30 are horizontally maintained, as shown in FIG. 1, such that the aluminum plate is stably supplied to the coiler 30.

As shown in FIG. 1, the pinch roller 20 is installed at a front end of the coiler 30. The pinch roller 20 functions to press an upper surface of the plate such that the plate fed along upper portions of the feeding rollers 10 is suppled in a state of closely contacting the winding drum 32 of the coiler 30. In other words, as shown in FIG. 1, the pinch roller 20 conveys, while pressing, the upper surface of the plate conveyed to the upper portion of the roller constituting the horizontal output section so that the plate is supplied in a state of being in close contact with the winding drum of the winder.

The coiler 30 is a device configured to wind an aluminum plate in the form of a coil. Similarly to a general coiler, the coiler 30 includes the winding drum 32 configured to rotate by the driver 31.

Figure 2:
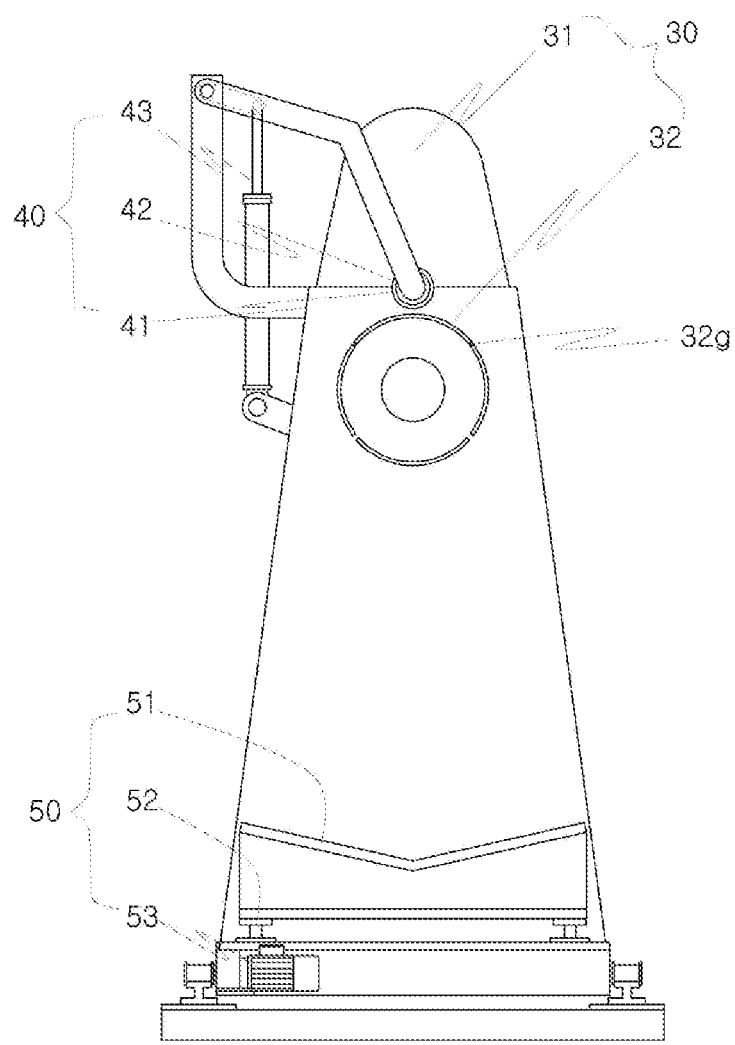
FIG. 2 is a front view of the aluminum plate coiling device according to the exemplary embodiment of the present invention.

However, the guide 40 is further installed at one side of the winding drum 32. As shown in FIG. 2, at least one slit 32g extending in a width direction of the plate is formed at the winding drum 32 in order to fix one end of the plate. That is, the aluminum plate coiling device according to the exemplary embodiment of the present invention is a device configured to wind an aluminum plate having a thickness of 3 to 10 mm in the form of a coil. Even when the plate is separated from the winding drum 32 in a state of being wound around the winding drum 32 in the form of a coil, the plate may maintain the coil form, without provision of a winding roll as in the case of a thread coil or a film coil. However, it is necessary to fix one end of the plate to the winding drum 32. To this end, the slit 32g is formed. Of course, the slit 32g is narrowed when the completely-wound coil is separated from the winding drum 32 and, as such, may also function to allow the coil to be easily separated from the winding drum 32.

Figure 3:
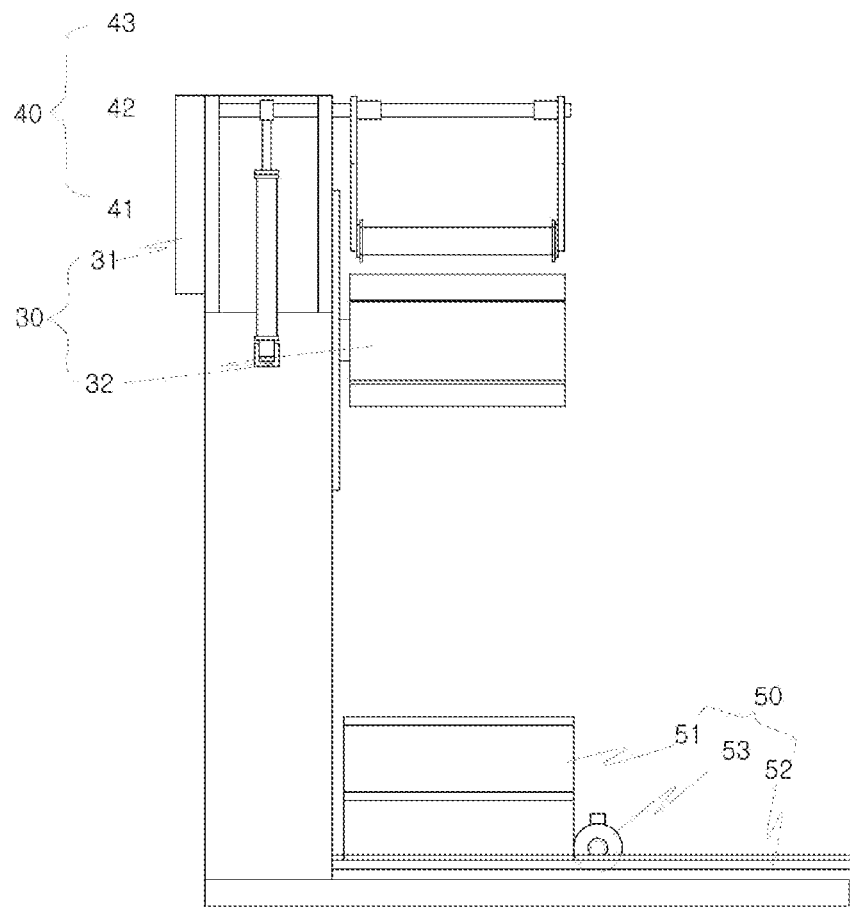
FIG. 3 is a side view of the aluminum plate coiling device according to the exemplary embodiment of the present invention.
Figure 4:
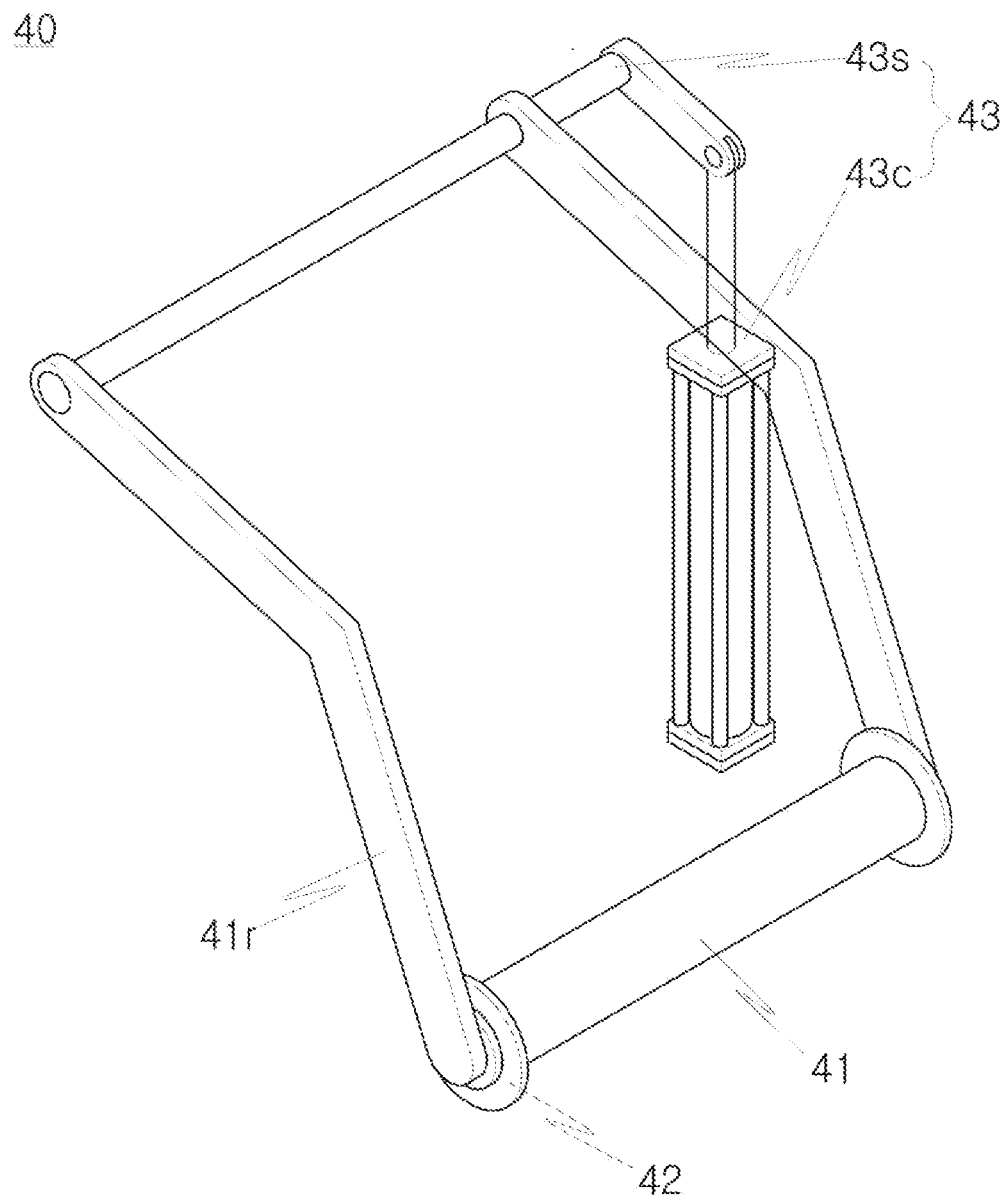
FIG. 4 is a perspective view of an example of a guide constituting the aluminum plate coiling device according to the exemplary embodiment of the present invention.

The guide 40 guides the aluminum plate to be supplied to a predetermined portion of the winding drum 32 during winding. As shown in FIGS. 3 and 4, the guide 40 includes a pushing roller 41 installed at one end of a pivoting rod 41r pivotally mounted to the coiler 30 at the other end thereof, and configured to press, toward the winding drum 32, the plate fed to a position over the winding drum 32, guide plates 42 respectively installed at opposite ends of the pushing roller 41 and configured to guide the plate to be wound on the winding drum 32 while preventing opposite edges of the plate from escaping from the winding drum 32, and a pivoting device 43 configured to pivot the pivoting rod 41r, thereby causing the pushing roller 41 to always be urged against the winding drum 32.

In the guide 40 configured as described above, the pushing roller 41 presses the plate wound on the winding drum 32 such that a currently wound portion of the plate is maintained in a state of closely contacting an already wound portion of the plate, and the guide plates installed at opposite ends of the pushing roller 41 guide winding of the currently wound portion of the plate such that opposite ends of the currently wound plate portion do not escape from opposite ends of the already wound plate portion.

In addition, in the coiling device according to the exemplary embodiment of the present invention, a coil discharging device 50 is further installed under the winding drum 32.

The coil discharging device 50 is a device configured to separate the plate coil wound on the winding drum 32 from the coiler 30, and then to discharge the separated plate coil. The coil discharging device 50 includes a coil bogie 51 configured to support a plate coil separated from the winding drum 32, a guide rail 52 configured to guide movement of the coil bogie 51, and a driver 53 configured to move the coil bogie 51 along the guide rail 52.

As apparent from the above description, in the aluminum plate coiling device according to the exemplary embodiment of the present invention, the entire configuration thereof is simple and, as such, a limitation in installation space is reduced, and the amount of materials used for manufacture of the device is reduced. Thus, a reduction in manufacturing cost may be achieved.

In addition, in accordance with the exemplary embodiment of the present invention, there is an effect of coiling an aluminum plate without generating distortion or deformation of the aluminum plate.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A coiling device for coiling an aluminum alloy plate to be used as a material of a can or a case for a battery, the coiling device comprising:
   a plurality of feeding rollers configured to feed the aluminum alloy plate output after being rolled;
   a pinch roller configured to press the aluminum alloy plate fed by the plurality of feeding rollers toward a coiler;
   the coiler comprising a winding drum configured to rotate in accordance with driving of a driver, thereby winding the aluminum alloy plate on the winding drum; and
   a guide configured to guide the aluminum alloy plate such that the aluminum alloy plate is uniformly wound without escaping from an end of the winding drum,
   wherein the guide comprises:
   a pushing roller installed at one end of a pivoting rod pivotally mounted to the coiler at another end thereof, and configured to press, toward the winding drum, the aluminum alloy plate fed to a position over the winding drum;
   guide plates respectively installed at opposite ends of the pushing roller and configured to guide the aluminum alloy plate to be wound on the winding drum while preventing opposite edges of the aluminum alloy plate from escaping from the winding drum; and
   a pivoting device configured to pivot the pivoting rod, thereby causing the pushing roller to always be urged against the winding drum, wherein the winding drum is formed with at least one slit extending in a width direction of the aluminum alloy plate, the cooling device further comprising:

a coil discharging device installed under the winding drum, wherein the coil discharging device comprises:

a coil bogie configured to support a plate coil separated from the winding drum;

a guide rail configured to guide movement of the coil bogie; and a driver configured to move the coil bogie along the guide rail, wherein the plurality of feeding rollers comprise a plurality of horizontal input sections installed to be spaced apart from one another in a uniform distance, while being in parallel to neighboring ones of the plurality of horizontal input sections, installed horizontally at an end to which the aluminum alloy plate is fed, and configured to convey the aluminum alloy plate toward the winding drum, a plurality of horizontal output sections installed horizontally higher than the plurality of horizontal input sections and a portion adjacent to the pinch roller, and a plurality of inclined conveying sections installed to be inclined and disposed between the plurality of horizontal input sections and the plurality of horizontal output sections, wherein the pinch roller is installed between the plurality of horizontal output sections and a front end of the coiler, and is configured to convey, while pressing, an upper surface of the aluminum alloy plate conveyed to an upper portion of the plurality of feeding rollers comprising the plurality of horizontal output sections so as to allow the aluminum alloy plate to be supplied in a state of being in contact with the winding drum of the coiler, wherein the plurality of horizontal output sections, adjacent to the pinch roller, are horizontally maintained so as to allow the aluminum plate to be supplied to the coiler, and wherein the plurality of inclined conveying sections are configured to apply force to the aluminum alloy plate conveyed to the coiler in an opposite direction to the winder such that the aluminum alloy plate, while being wound by the coiler, maintains tension and thereby is uniformly coiled.

* * * * *